Figure 1:
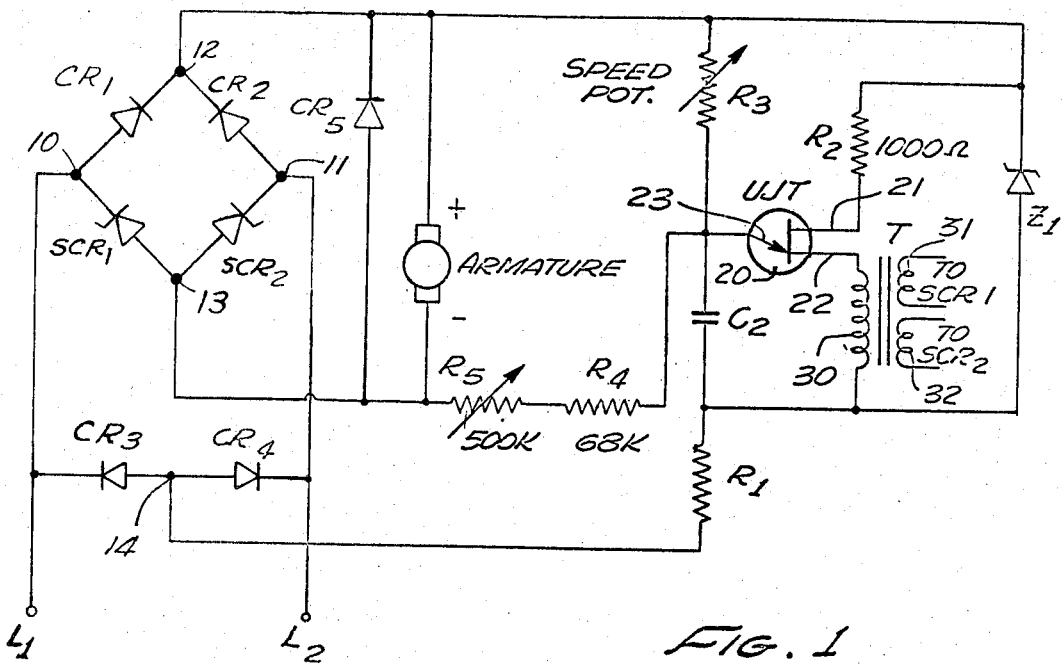

United States Patent [19]
Mason

[11] 3,849,710
[45] Nov. 19, 1974

[54] MOTOR SPEED CONTROL CIRCUIT

[75] Inventor: Raymond J. Mason, Lynwood, Calif.

[73] Assignee: Minarik Electric Co., Los Angeles, Calif.

[22] Filed: Dec. 26, 1973

[21] Appl. No.: 428,251

Related U.S. Application Data

[63] Continuation of Ser. No. 290,244, Sept. 18, 1972, abandoned.

[52] U.S. Cl. ............................................. 318/331
[51] Int. Cl. ............................................ H02p 5/16
[58] Field of Search........................... 318/331, 345

[56] References Cited
UNITED STATES PATENTS

| | | |
|---|---|---|
| 3,239,742 | 3/1966 | Mierendorf ........................ 318/331 |
| 3,447,055 | 5/1969 | Mason ............................... 318/331 |
| 3,582,738 | 6/1971 | Claasen............................. 318/331 |
| 3,634,874 | 1/1972 | Mason ............................... 318/331 |

Primary Examiner—Robert K. Schaefer
Assistant Examiner—Thomas Langer

[57] ABSTRACT

A motor speed control circuit for direct current motors, including a pair silicon-controlled rectifier devices for controlling flow of current to a motor armature, a transformer having a pair of secondary windings for controlling the conductivity of the SCR devices, a unijunction transistor controlling the transformer, and a speed setting potentiometer which is coupled in parallel to the motor armature.

8 Claims, 2 Drawing Figures

MOTOR SPEED CONTROL CIRCUIT

RELATED APPLICATION

This application is a continuation of application Ser. No. 290,244, filed Sept. 18, 1972.

PRIOR ART

A full-wave speed regulation circuit for shunt wound direct current motors is illustrated, for example, in the General Electric SCR Manual, Third Edition, 1964, at Page 145 in FIG. 8.33. A full-wave speed regulation circuit is also shown in the Mason U.S. Pat. No. 3,447,055.

BACKGROUND OF THE INVENTION

The GE circuit referred to above is workable and is useful but incorporates only a single SCR device. Its performance is quite limited, which I attribute to the fact that a very rapid turn-off characteristic of the SCR device is essential to good performance. According to the present invention I utilize a pair of SCR devices, which are incorporated into the circuit in an appropriate manner. This modification would, theoretically, provide the potential for improved circuit performance, because the two SCR devices are now connected in series between the two conductors of the alternating current supply line, and therefore receive a positive turn-off each time that the voltage reverses. Another modification I have made is the omission of diode D1 which was utilized in the GE circuit. In the prior circuit the diode D1 cooperated with the capacitor C2 for controlling its charging and discharging action, but according to the present invention I find that a much better operation is achieived by omitting it.

The Mason patent utilized both current and voltage feedback means incorporated into a moderately complex circuit.

The primary object of the present invention, therefore, is to provide a new and improved full-wave speed reggulation circuit for direct current motors which is reliable in its operation, contains a small number of component parts, and is inexpensive to manufacture.

DRAWING SUMMARY

Figure 2:
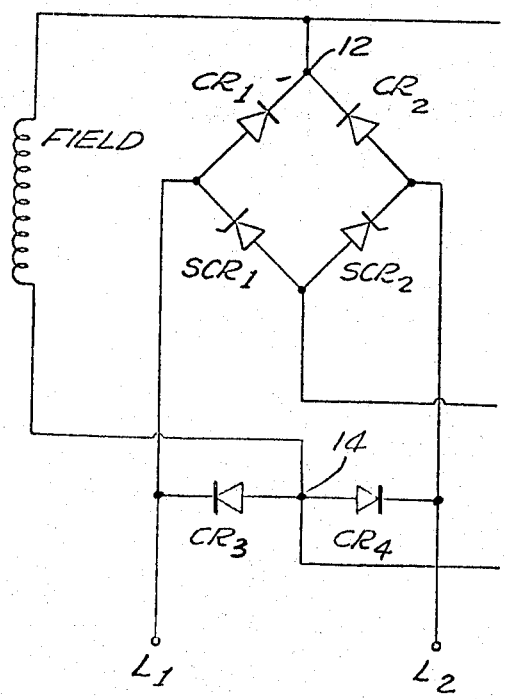

FIG. 1 is a schematic diagram of the presently preferred form of the invention; and FIG. 2 illustrates the field winding connection.

PREFERRED EMBODIMENT

FIG. 1 of the drawing illustrates the preferred circuit of my invention which is preferably utilized in conjunction with a direct current motor of the permanent magnet type.

A bridge rectifier circuit has a first input terminal 10, a second input terminal 11, a first output terminal 12, and a second output terminal 13. A first diode CR1 has its anode connected to input terminal 10 while its cathode is connected to output 12. A second diode CR2 has its anode connected to input terminal 11 and its cathode connected to output terminal 12. A first silicon-controlled rectifier device SCR1 has its anode connected to output terminal 13 while its cathode is connected to input terminal 10. A second silicon-controlled rectifier device SCR 2 has its anode connected to output terminal 13 while its cathode is connected to input terminal 11.

Alternating voltage from the supply line is received on two conductors identified as L1 and L2 which are connected to input terminals 10 and 11, respectively. A third diode CR3 has its anode connected to a third output terminal 14 while its cathode is connected to input terminal 10. A fourth diode CR4 has its anode connected to output terminal 14 while its cathode is connected to input terminal 11.

A fifth diode CR5 has its anode connected to output terminal 13 while its cathode is connected to output terminal 12. This diode provides the conventional "free wheeling" operation during certain portions of the cycle.

The motor armature is connected between the output terminals 12 and 13 and receives positive potential from the bridge output 12 while the negative potential is supplied through bridge output 13.

A dropping resistor R1 has one of its ends connected to the third terminal 14. A Zener diode Z1 is connected between output terminal 12 and the other end of R1. The Zener diode Z1 provides a regulated voltage for a unijunction transistor 20 (designated also by the symbol UJT), which in turn controls the conductivity of the SCR devices.

Thus the UJT 20 has main current terminals 21 and 22. A resistor R2 is connected between terminal 21 and terminal 12. The primary winding 30 of a transformer T is connected between terminal 22 and the other end of resistor R1. Charge for triggering the UJT is stored on a capacitor C2 which is connected between control electrode 23 of the UJT and the said other end of R1.

Transformer T also includes secondary windings 31 and 32 which are connected between the gate and cathode leads of SCR1 and SCR2, respectively, to control the initiation of the conductivity of the SCR devices at appropriate times during the alternating current cycle.

A speed potentiometer R3 is connected between output terminal 12 and the control electrode 23 of the UJT. Additional resistance means is connected between output terminal 13 and the control electrode 23. Specifically, this additional resistance means includes the series combination of a fixed resistor R4 and a variable resistor R5.

It will be noted that the fixed resistor R4 has a value of 68,000 Ohms while the variable resistor R5 has a much larger value of 500,000 Ohms. The adjustment of R5 is preferably a factory adjustment, to set the circuit at a point of optimum performance.

The speed potentiometer R3 is utilized in the day to day operation of the speed regulation circuit, for selecting a desired speed at which the direct current motor is to operate.

It is important that the additional resistance means R4 and R5 is bilateral and does not include a diode coupled therein. Consequently, the charging and discharging of capacitor C2 is controlled entirely by resistance values, the capacitance value of the capacitor, voltage values, and time.

MODE OF OPERATION

The operation of the circuit of FIG. 1 is as follows:

When the SCR's are not conducting there are two current paths:

a. current flows from terminal 12 through Armature, R5 and R4, C2, and R1 to terminal 14.

b. Current flows from terminal 12 through Potentiometer R3, C2, and R1 to terminal 14.

The branch point for these two current paths is control electrode 23. Both paths involve a change in the charge on capacitor C2.

When the SCR's do conduct there are two different current paths:

c. Current flows from terminal 12 through Armature to terminal 13.

d. Current flows from terminal 12 through R3, R4, and R5 to terminal 13.

At the same time current continues to flow through path (b). The current in path (a) is extinguished, however, because negative terminals 13 and 14 have the same potential. The current through path (d) cancels out the current that would otherwise have flowed through path (a).

Voltage feedback from the armature occurs when the SCR's are not conducting. The back e.m.f. appears directly across the Armature and influences the magnitude of the current in path (a) and hence the charging rate of capacitor C2. The voltage feedback is positive and raises the armature voltage under load in order to provide good speed regulation.

It will be noted that the direction of current flow through resistors R4 and R5 reverses each time the SCR's are switched on or off. When the SCR's are off the current follows path (a), and when they are on the current follows path (d), these two paths involving opposite directions of the current flow through R4 and R5.

By contrast, in the prior Mason U.S. Pat. No. 3,447,055 there is no equivalent reversal of current. Current flow through resistors R1 and R2 is kept unilateral by the bridge rectifier D1, D2, SCR, SCR2. Current through R3 and P2 is unilateral for the same reason. Current through R7 is unilateral because of rectifying action at the emitter of Q2.

ALTERNATE FORM

As shown in FIG. 2, when the speed regulation circuit is used in conjunction with a shunt wound direct current motor, the field winding of the motor is preferably connected directly between the first output terminal 12 and the third output terminal 14 of the circuit.

As will be understood by those skilled in the art, what has been described are preferred embodiments in which modifications and changes may be made without departing from the spirit and scope of the accompanying claims.

What is claimed is:

1. A motor speed control circuit comprising:
    a bridge rectifier circuit having first and second input terminals and first and second output terminals, and including a pair of silicon-controlled rectifier devices coupled between respective ones of said input terminals and said second output terminal;
    means for directly coupling a motor armature between said first and second output terminals;
    said bridge rectifier also including first and second diodes coupled between respective ones of said input terminals and said first output terminal
    third and fourth diodes coupled between respective ones of said input terminals and a third output terminal;
    a first resistor having one end connected to said third output terminal;
    a Zener diode connected between said first output terminal and the other end of said first resistor;
    a unijunction transistor having its main current path coupled in series with the primary winding of a transformer, said series circuit being coupled across said Zener diode, said transformer having two secondary windings controlling respective ones of said silicon-controlled rectifier devices;
    a speed potentiometer directly connected between said first output terminal and the control electrode of said unijunction transistor;
    a capacitor coupled between said control electrode and said other end of said first resistor; and
    additional bilateral resistance means connected directly between said second output terminal and said control electrode.

2. The circuit of claim 1 wherein said additional resistance means includes a variable resistor.

3. The circuit of claim 2 wherein said additional resistance means also includes a fixed resistor connected in series with said variable resistor.

4. The circuit of claim 1 which also includes a fifth diode connected between said first and second output terminals.

5. The circuit of claim 1 wherein a motor field winding is connected between said first and third output terminals.

6. A motor speed control circuit comprising:
    a first full-wave bridge rectifier circuit having input and output terminals, and including means for controlling the initiation of current conduction during each half cycle of an applied alternating voltage wave;
    means directly coupling a motor armature across said output terminals of said first rectifier circuit;
    a speed potentiometer and a bilateral resistance means connected together in series, the series combination thereof being connected in parallel to said motor armature;
    a second full-wave bridge rectifier circuit having one output terminal which is common to one of the output terminals of said first bridge rectifier circuit; and
    a current conduction control circuit coupled between the output terminals of said second bridge rectifier circuit so as to be energized thereby, said current conduction control circuit being coupled to said current controlling means of said first rectifier circuit for controlling the operation thereof;
    said current conduction control circuit also including a control electrode which is coupled to the juncture of said speed potentiometer and said bilateral resistance means.

7. The control circuit of claim 6 wherein said current conduction control circuit includes a unijunction transistor and a capacitor connected to the control electrode of said unijunction transistor, the juncture of said speed potentiometer and said bilateral resistance means being directly connected to said control electrode of said unijunction transistor.

8. A motor speed control circuit comprising:
    a first full-wave bridge rectifier circuit having input and output terminals, and including means for controlling the initiation of current conduction during each half cycle of an applied alternating voltage wave;

means directly coupling a motor armature across said output terminals of said first rectifier circuit;

a second full-wave bridge rectifier circuit having one output terminal which is common to one of the output terminals of said first bridge rectifier circuit;

a speed potentiometer having one end connected to said common output terminal of said bridge rectifier;

a capacitor having one terminal connected to the other end of said speed potentiometer, the other terminal of said capacitor being coupled to the other output terminal of said second bridge rectifier;

a current conduction control circuit coupled between the output terminals of said second bridge rectifier circuit so as to be energized thereby, said current conduction control circuit being coupled to said current controlling means of said first rectifier circuit for controlling the operation thereof; said current conduction control circuit also including a control electrode which is coupled to the juncture of said speed potentiometer and said capacitor; and bilateral resistance means connected between said juncture and the non-common output terminal of said first bridge rectifier;

the operation being such that as current conduction through said first bridge rectifier is initiated or interrupted the current flow through said bilateral resistance means reverses in order to influence the charge on said capacitor in accordance with voltage feedback developed by the motor armature.

* * * * *